(12) United States Patent
Saint-Michel et al.

(10) Patent No.: US 12,328,031 B2
(45) Date of Patent: Jun. 10, 2025

(54) STATOR FOR A ROTATING ELECTRICAL MACHINE

(71) Applicant: Moteurs Leroy-Somer, Angouleme (FR)

(72) Inventors: Jacques Saint-Michel, Angouleme (FR); Francois Turcat, Montignac sur Charente (FR); Cedric Plasse, Linars (FR); Olivier Gas, Gond-Pontouvre (FR)

(73) Assignee: MOTEURS LEROY-SOMER (FR)

( * ) Notice: Subject to any disclaimer, the term of this patent is extended or adjusted under 35 U.S.C. 154(b) by 811 days.

(21) Appl. No.: 17/057,972

(22) PCT Filed: Jun. 4, 2019

(86) PCT No.: PCT/EP2019/064495
§ 371 (c)(1),
(2) Date: Nov. 23, 2020

(87) PCT Pub. No.: WO2019/234024
PCT Pub. Date: Dec. 12, 2019

(65) Prior Publication Data
US 2021/0218294 A1 Jul. 15, 2021

(30) Foreign Application Priority Data
Jun. 7, 2018 (FR) ...................................... 1854961

(51) Int. Cl.
*H02K 1/16* (2006.01)
*H02K 1/27* (2022.01)
(Continued)

(52) U.S. Cl.
CPC ............. *H02K 1/165* (2013.01); *H02K 1/276* (2013.01); *H02K 21/14* (2013.01); *H02K 29/03* (2013.01)

(58) Field of Classification Search
CPC ........ H02K 29/03; H02K 21/14; H02K 1/276; H02K 1/165
(Continued)

(56) References Cited

U.S. PATENT DOCUMENTS 2,711,008 A    6/1955   Smith
3,320,451 A *  5/1967   Wiley ...................... H02K 1/16
                                                      29/605

(Continued)

FOREIGN PATENT DOCUMENTS

EP    1175720 A1   1/2002
EP    3154154 A1   4/2017
(Continued)

OTHER PUBLICATIONS

International Search Report (ISR) for PCT/EP2019/064495 mailed Jul. 24, 2019 (5 pages).
(Continued)

*Primary Examiner* — Alex W Mok
(74) *Attorney, Agent, or Firm* — Jason A. Smith; Shumaker, Loop & Kendrick, LLP (57) ABSTRACT

A stator including a ring having teeth with slots there between, and bridges of material each connecting two adjacent teeth at their base on the side of the air gap and defining the bottom of the slot between these teeth. The bridges of material each having at least one region of reduced magnetic permeability that is in the form of at least one localized narrowing formed by a groove or a localized crushing of the material, and/or at least one opening with the width l of the bridge of material, and/or at least one localized treatment in the with l of the bridge of material, which locally reduces the magnetic permeability of the bridge of material, and windings placed in the slots of the ring.

17 Claims, 5 Drawing Sheets

(51) Int. Cl.
*H02K 1/276* (2022.01)
*H02K 21/14* (2006.01)
*H02K 29/03* (2006.01)

(58) Field of Classification Search
USPC ...................................... 310/156.56, 216.069
See application file for complete search history.

(56) References Cited

U.S. PATENT DOCUMENTS

| | | | |
|---|---|---|---|
| RE34,667 E * | 7/1994 | Neumann | H02K 17/20 |
| | | | 310/216.069 |
| 5,498,917 A | 3/1996 | Ninomiya et al. | |
| 6,064,132 A | 5/2000 | Nose | |
| 6,225,725 B1 | 5/2001 | Itoh et al. | |
| 6,429,568 B1 | 8/2002 | Shen et al. | |
| 6,844,653 B2 * | 1/2005 | Kolomeitsev | H02K 1/148 |
| | | | 310/216.082 |
| 6,935,011 B2 | 8/2005 | Shiah | |
| 7,528,519 B2 | 5/2009 | Miyashita | |
| 7,560,844 B2 | 7/2009 | Miyashita et al. | |
| 7,646,129 B2 * | 1/2010 | Evans | H02K 1/02 |
| | | | 310/216.106 |
| 7,851,966 B2 * | 12/2010 | Rippel | H02K 3/48 |
| | | | 310/215 |
| 8,129,880 B2 * | 3/2012 | Rahman | H02K 3/345 |
| | | | 310/216.069 |
| 8,575,814 B2 * | 11/2013 | Chamberlin | H02K 3/345 |
| | | | 310/180 |
| 8,836,196 B2 * | 9/2014 | Calley | H02K 3/18 |
| | | | 310/216.133 |
| 9,899,888 B2 * | 2/2018 | Shibata | H02K 3/28 |
| 9,906,085 B2 * | 2/2018 | Nakamura | H02K 1/16 |
| 10,177,611 B2 | 1/2019 | Kawasaki et al. | |
| 10,630,155 B2 | 4/2020 | Li et al. | |
| 11,489,375 B2 | 11/2022 | Li et al. | |
| 2003/0193260 A1 * | 10/2003 | Reiter, Jr. | H02K 1/02 |
| | | | 310/216.064 |
| 2003/0201687 A1 | 10/2003 | Asai | |
| 2006/0108890 A1 * | 5/2006 | Hauger | H02K 23/405 |
| | | | 310/214 |
| 2007/0075604 A1 | 4/2007 | Hsu | |
| 2010/0007236 A1 | 1/2010 | Sano et al. | |
| 2011/0037338 A1 * | 2/2011 | Leiber | H02K 15/022 |
| | | | 310/216.105 |
| 2012/0275942 A1 | 11/2012 | Knapp et al. | |
| 2016/0365756 A1 * | 12/2016 | Li | H02K 15/02 |
| 2017/0033620 A1 * | 2/2017 | Saint-Michel | H02K 15/066 |
| 2017/0055669 A1 | 3/2017 | Li et al. | |
| 2018/0115202 A1 * | 4/2018 | Hirotani | H02K 1/16 |

FOREIGN PATENT DOCUMENTS

| | | |
|---|---|---|
| EP | 3288155 A1 | 2/2018 |
| FR | 3019947 A1 | 10/2015 |
| JP | H02 7839 A | 1/1990 |
| JP | 2875497 B2 | 3/1999 |
| JP | 2001218429 A | 8/2001 |
| JP | 2011-097723 A | 5/2011 |
| JP | 2017-118744 A | 6/2017 |
| WO | 2017110476 A | 6/2017 |
| WO | 2019234031 A1 | 12/2019 |

OTHER PUBLICATIONS

International Search Report (ISR) for PCT/EP2019/064504 mailed Jul. 24, 2019 (6 pages.).
Non-Final Office Action (NFOA) issued for U.S. Appl. No. 17/057,969, mailed Jul. 7, 2023 (17 pages).
Notice of Allowability issued for U.S. Appl. No. 17/057,969, mailed Dec. 5, 2023 (7 pages).
Supplemental Notice of Allowability issued for U.S. Appl. No. 17/057,969, mailed Dec. 11, 2023 (2 pages).

* cited by examiner

STATOR FOR A ROTATING ELECTRICAL MACHINE

TECHNICAL FIELD AND BACKGROUND

The present invention relates to rotary electric machines, and more particularly to the stators of such machines.

In most known stators, the yoke forms slots that are fully open or semi-open toward the air gap, so as to allow the windings to be installed. In general, the semi-open slots accept electrical conductors of circular transverse section placed loosely, whereas the open slots house electrical conductors of rectangular transverse section placed in an ordered manner.

JP 2 875497 relates to a stator for an electrical machine comprising a toothed ring of which the laminations have thinned portions in their thicknesses, these portions being situated between two consecutive teeth on the side of the air gap. Such thinned portions constitute openings toward the air gap which may produce non-insignificant electromagnetic disturbances, notably an increase in the "magnetic" air gap because of the flux fringing, iron losses that are greater at the surface of the rotor for the same reason, or else torques that are pulsating because the variations in permeance are relatively sharp.

JP 2011-097723 discloses individual teeth attached to a yoke.

Patent application FR 3 019 947 describes a stator having a toothed ring that has teeth connected to one another by bridges of material and defining between them slots for receiving the coils, the slots being open radially toward the outside. The openings of the slots are closed by a yoke attached to the toothed ring.

There is a need to further improve stators for electric machines and in particular to reduce the torque ripple.

SUMMARY

The invention responds to this need through a stator comprising:
- a ring comprising:
  - teeth creating between them slots, and
  - bridges of material each connecting two adjacent teeth at their base on the side of the air gap and defining the bottom of the slot between these teeth, at least some, and better still all, of the bridges of material each having at least one region of reduced magnetic permeability that is in the form of:
    - at least one localized narrowing formed by at least one groove extending along the longitudinal axis of the stator in the thickness of the bridge of material or at least one localized crushing of the material in the width of the bridge of material, and/or
    - at least one opening in the width of the bridge of material, and/or
    - at least one localized treatment in the width of the bridge of material, which locally reduces the magnetic permeability of the bridge of material, and
- windings placed in the slots of the ring.

The region of reduced magnetic permeability formed by the localized narrowing, the localized crushing, the opening or the localized treatment of the bridge of material allows said region of the bridge of material to be magnetically saturated when the machine is in operation, this limiting the passage of the flux in the bridge of material and increasing the efficiency of the machine.

Furthermore, such a stator greatly reduces the electromagnetic disturbances associated with the presence of the slots opening onto the air gap in the prior art. The absence of opening of the slots toward the air gap makes it possible to reduce the slot pulsation.

The electromagnetic performance of the machine is improved.

In addition, the presence of the bridges of material reduces the risk of lacquer being lost in the air gap when the complete stator is being impregnated with a lacquer. This makes it possible to reduce the need for cleaning.

It also makes it possible to reduce the leakage of the lacquer into the air gap during operation of the machine on which the stator is mounted. This simplifies the maintenance of the machine. The term "lacquer" should be understood broadly here, and covers any type of impregnation material, in particular polymer material.

Stator

Slots Open Radially Toward the Outside

As a preference, the slots are open radially toward the outside of the ring. As a preference, the slots are fully open. The windings can then be inserted into the slots by moving radially toward the inside of the slots. This makes installation of the windings easier, on the one hand insofar as access to the inside of the slots is easier, these being slots that are completely open and toward the outside rather than toward the air gap, and on the other hand insofar as the space available around the ring, for the necessary tooling, or even for a winding machine, is greater than the space available in the bore of the stator. Furthermore, because the filling of the slots is easier, the degree of filling can be improved, and this may make it possible to improve the performance of the machine still further. The torque per unit volume can be increased, in particular.

Yoke

As a preference, the stator comprises a yoke attached to the ring.

What is meant by an "attached yoke" is that the yoke is not produced as one piece with the ring but attached to the latter during the manufacture of the stator.

The yoke is able to close the slots of the ring and hold the windings in the slots after they have been inserted. During the manufacture of the stator, the yoke may be assembled with the ring in a number of ways.

Yoke-Ring Interface

As a preference, the ring has reliefs on its exterior surface, collaborating with complementary reliefs belonging to the yoke. Such reliefs, through collaborating shapes, allow the ring and the yoke to be kept fixed relative to one another. The collaborating reliefs are preferably of the diamond-point type.

The ring may be produced by winding into a helix a strip of sheet metal comprising teeth which are connected by the bridges of material, the opposing edges of each slot becoming, preferably, substantially mutually parallel when the strip is wound on itself to form the ring.

In a variant, the strip may be formed of sectors each comprising several teeth, the sectors being connected by links, these sectors being cut from a strip of sheet metal. The links may be flexible bridges connecting the sectors to one another and/or parts of complementary shapes, for example of the dovetail and mortise type, or complementary reliefs that come to bear against one another, notably when the ring is held in compression by the yoke.

The complementary shapes may be on the bridges of material so that the various sectors are assembled at the level of the bridges of material. As a preference, the assembling of the complementary shapes of the various sectors is performed away from the localized narrowings, openings and/or treatments. For example, the sectors exhibit recessed shapes which collaborate with complementary projecting shapes belonging to an adjacent sector.

In a variant, the ring comprises a stack of precut magnetic laminations.

In a further variant, the ring is manufactured using additive manufacturing, for example using powder sintering.

The yoke may be produced by winding directly into a helix a strip of sheet metal if its width permits this, possibly, or possibly not, accompanied by the forming of suitable slots in said strip of sheet metal at the time of cutting it, so as to facilitate this winding, by stacking precut magnetic laminations or slices obtained by additive manufacturing, for example by powder sintering.

The yoke may be attached to the ring after the windings have been fitted into the slots.

Closed Lamination Stator

In a variant, the stator may have slots that are closed within the ring, i.e. which do not have an opening toward the air gap or toward the outside. In that case, the windings are in the form of pins, notably U-shaped (known as "U-pin") or I-shaped (known as "I-pin"), and are inserted by moving in the longitudinal direction.

Because the slots are closed, the stator may be used as a closed impregnation chamber by ensuring sealing at the ends only. The tooling is thus simplified. This also reduces the amount of lacquer or resin used.

Slots

At least one slot, and, better still, all the slots, may have mutually parallel opposing edges. The width of the slots is preferably substantially constant over the entire slot height.

At least one tooth and, better still, all the teeth, may be of trapezoidal overall shape when viewed in section in a plane perpendicular to the longitudinal axis of the stator.

As a preference, all the bridges of material have a region of reduced magnetic permeability that is in the form of:
at least one localized narrowing formed by at least one groove extending along the longitudinal axis of the stator in the thickness of the bridge of material or at least one localized crushing of the material in the width of the bridge of material, and/or
at least one opening in the width of the bridge of material, and/or
at least one localized treatment in the width of the bridge of material, which locally reduces the magnetic permeability of the bridge of material.

Each region of reduced magnetic permeability preferably extends over the entire thickness of the ring.

In a variant, the region of reduced magnetic permeability extends over a length less than or equal to the thickness of the ring.

The region of reduced magnetic permeability of each bridge of material is preferably continuous in the thickness of the ring, and may or may not be rectilinear.

In a variant, the region of reduced magnetic permeability is discontinuous in the thickness of the ring.

For example, the ring is in the form of stacked laminations, having teeth connected to one another at their base on the side of the air gap by bridges of material, at least some and better still all of the bridges of material of each of the laminations each having at least one region of reduced magnetic permeability. It is possible for the regions of reduced magnetic permeability of the bridges of material of each of the laminations not to be centered. At least two adjacent laminations may have at least two regions of reduced magnetic permeability that are arranged in an offset staggered manner relative to one another, and may or may not partially intersect one another. The offset staggered configuration may be achieved by turning over certain laminations, notably every second lamination, of the stack of laminations that makes up the ring or by cutting the laminations at an angle or by the use of differing laminations.

Groove

Preferably, in the case in which the bottom of the slots has at least one groove, the grooves are open toward the slots.

The bottom of the slots has at least one bearing surface, better still at least two bearing surfaces, oriented transversely and the bottom of the groove is set back relative to this or these surfaces. The one or more bearing surfaces may be oriented obliquely relative to the radial axis of the corresponding slot or, preferentially, oriented perpendicular to this axis. The groove forms a break in the slope relative to the one or more bearing surfaces. The windings, which are preferably substantially rectangular in cross section, inserted into the corresponding slot preferably bear against the bearing surfaces and are set back with respect to the bottom of the groove. As a preference, the windings are not in contact with the groove. The one or more bearing surfaces are preferentially flat. The bottom of the slot may be flat, with the exception of the groove. This allows good filling of the slots by the windings in the case of windings of rectangular transverse section, by allowing the coils to rest flat in the bottom of the slots.

The groove in the bottom of the slot preferably forms a clearance between the bridge of material and the corresponding winding, something which may make it easier for the lacquer to penetrate when impregnating the stator.

The bridge of material may comprise at least two grooves as described hereinabove.

The one or more grooves may be centered relative to the one or more slots, or on the contrary offset relative to a plane of symmetry of the one or more slots.

The internal surface of the stator is preferably a cylinder of revolution.

As a variant, the one or more grooves may extend on the internal surface of the stator, i.e. the surface of the stator that defines the air gap with the rotor.

When the one or more grooves are situated on the internal surface of the stator that defines the air gap with the rotor, they may allow angular orientation of the stator, and thus may make stacking the laminations and indexing easier. It is then possible for the stator to have no reliefs on its outer surface, and this may make it possible to improve the contact between the yoke and cooling means.

Preferably, the one or more grooves each have a profile that is curved in section on a plane perpendicular to the axis of the stator, in particular a section that is substantially semicircular.

Localized crushing

The localized crushing is realized in the width of the bridge of material, i.e. along a radial axis of the stator, and constitutes a localized narrowing having reduced magnetic permeability. The crushing preferably forms a groove in the bottom of the slot. In that case, the localized crushing may be as described above for the grooves.

Opening

The aforementioned opening preferentially extends along the longitudinal axis of the stator over the entire thickness of the ring.

The opening may have a transverse section that is oval, circular or polygonal, for example with rounded corners, and in particular rectangular.

It is possible for the bridge of material to have only a single opening in its width.

The opening may be at the center of the bridge of material.

The opening may have two thinned regions on either side thereof, the thinned regions being magnetically saturated when the machine is in operation.

As a variant, the bridge of material has a plurality of microperforations in its width. The microperforations reduce the lamination section and allow the bridge of material to be magnetically saturated by a lower magnetic flux.

Treatment

The localized treatment makes it possible to locally modify the permeability of the material of the bridge to the magnetic flux.

The localized treatment may extend over the entire width of the bridge of material or only over a portion thereof.

This treatment may be a heat treatment that locally modifies the orientation of the grains of metal and causes a drop in the magnetic permeability in the circumferential direction.

As a variant, the heat treatment is a thermal stress associated with the degradation of the material during the laser cutting of the bridge of material.

The bridges of material may be nondeformable. This increases the stiffness of the stator and improves the lifetime of the electric machine.

Windings

The windings may be placed in the slots in a concentrated or a distributed manner.

What is meant by "concentrated" is that the windings are each wound around a single tooth.

What is meant by "distributed" is that at least one of the windings passes successively through two non-adjacent slots.

As a preference, the windings are placed in the slots in a distributed manner, notably when the number of rotor poles is less than or equal to 8.

The windings each comprise at least one electrical conductor which may, in transverse section, be circular in shape, or in the shape of a polygon with rounded corners, preferably, amongst others, a rectangular shape.

When the conductors are circular in transverse section, they may be placed in the slot in a hexagonal stack. When the conductors are polygonal in transverse section, they may be placed in the slot in one or more rows oriented radially. Optimizing the stack may make it possible to dispose a greater quantity of electrical conductors in the slots, and therefore to obtain a more powerful stator, with the same volume.

The electrical conductors may be placed randomly in the slots or arranged therein. As a preference, the electrical conductors are arranged in the slots. What is meant by "arranged" is that the conductors are not placed loosely in the slots but are placed therein in an orderly manner. They are stacked in the slots non-randomly, for example being placed in one or more rows of aligned electrical conductors, notably in one or two rows, preferably in a single row.

The electrical conductors are electrically insulated from the outside by an insulating coating, in particular an enamel.

The windings may be separated from the walls of the slot by insulation, notably by at least one sheet of insulation. Such sheet insulation allows better electrical insulation of the windings relative to the stator mass.

As a preference, each slot accepts at least two windings, notably at least two windings with different phases. These two windings may be radially superposed.

The two windings may be separated from one another by at least one sheet of insulation, preferably by at least two sheets of insulation, when one sheet is wrapped around each winding.

Each winding may be formed of several turns.

In a variant, the windings are in the form of pins, notably U-shaped (known as "U-pin") or straight, I-shaped (known as "I-pin"), and in that case comprise a portion in the shape of an I or of a U the ends of which are welded to conductors outside of the corresponding slot.

The stator may be twisted (better known as "skewed"). Such skewing may contribute to tightening the windings in the slots and to reducing the slot harmonics.

Machine and Rotor

A further subject of the invention is a rotary electrical machine comprising a stator as defined hereinabove. The machine may or may not be synchronous. The machine may be a reluctance machine. It may constitute a synchronous motor.

The rotary electrical machine may comprise a wound rotor or a permanent-magnet rotor.

Manufacturing Method and Machine

A further subject of the invention is a method for manufacturing a stator as defined above, in which the step of inserting the windings into the slots of the ring of the stator is performed.

The method may comprise a step consisting in attaching a yoke to the ring of the stator.

The method may comprise a step of cutting from the one same strip of material to form one or more ring and yoke laminations, the yoke and ring lamination or laminations having cuts in common.

The method may comprise a step of winding strips of sheet metal into a helix to form the ring and the yoke.

The method may comprise a step of heating the yoke and/or of cooling the ring in order to make it easier to fit the yoke on the ring.

Laminations

A further subject of the invention is a lamination for the ring of a stator, notably of the stator as described hereinabove, having:

teeth joined together at their base on the side of the air gap by bridges of material, at least some and, better still, all, of the bridges of material each exhibiting at least one region of reduced magnetic permeability that is in the form of:

at least one localized narrowing formed by at least one groove or a localized crushing, and/or at least one opening in the width of the thickness of the bridge of material, and/or at least one localized treatment in the width of the bridge of material, which locally reduces the magnetic permeability of the bridge of material.

When the stator is formed by stacking laminations as described above, the teeth of the laminations are aligned so as to form the teeth of the stator and the bridges of material of the laminations form the bridges of material of the stator by stacking.

The features described above in relation to the stator apply to the above lamination.

BRIEF DESCRIPTION OF THE DRAWINGS

The invention will be better understood upon reading the following detailed description of nonlimiting exemplary embodiments thereof, and studying the appended drawing, in which.

DETAILED DESCRIPTION

Figure 1:
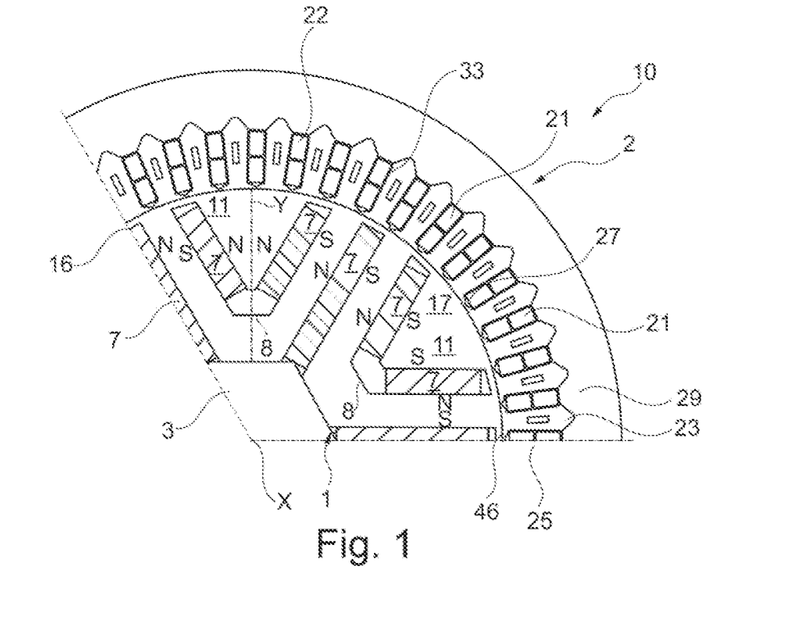
FIG. 1 depicts a partial and schematic view in transverse section of a machine comprising a stator produced in accordance with the invention, FIG. 2 schematically depicts a portion of the ring of the stator of the machine of FIG. 1.

FIG. 1 illustrates a rotary electrical machine 10 comprising a rotor 1 and a stator 2. The stator makes it possible to generate a rotary magnetic field driving the rotation of the rotor 1, notably in the context of a synchronous motor, and, in the case of an alternator, the rotation of the rotor induces an electromotive force in the stator windings.

The examples illustrated below are schematic and the relative dimensions of the various constituent elements have not necessarily been respected.

Stator

The stator 2 comprises windings 22 which are placed in slots 21 formed between teeth 23 of a toothed ring 25. The slots 21 are closed on the side of the air gap by bridges of material 27 each joining together two consecutive teeth of the ring 25.

The stator 2 comprises a yoke 29 attached to the ring 25.

The slots 21, in the example described, have mutually parallel radial edges 33 and, in section in a plane perpendicular to the axis of rotation X of the machine, are substantially rectangular in shape.

Figure 12:
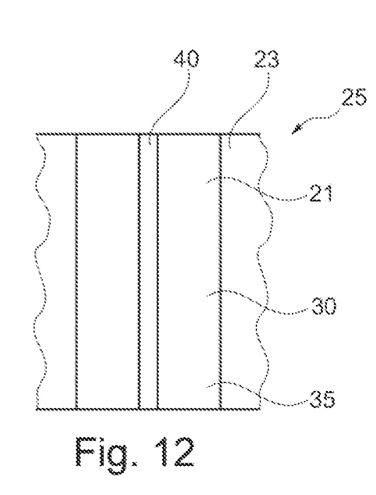
FIG. 12 schematically depicts a view from above of a slot of the embodiment of FIGS. 1 and 2, FIG. 13 schematically depicts a variant of the embodiment of the slot of FIG. 12, and FIG. 14 schematically depicts a variant of the embodiment of the slot of FIG. 1.

The bottom 35 of the slots 21 is of a shape that more or less complements that of the windings 22, with the exception of a groove extending along the longitudinal axis of the stator or of a crushing performed in a radial direction in the width d of the bridge of material 27. Below, reference will only be made to a groove, but it should be clearly understood that a localized crushing is also possible instead of the groove. In the example of FIGS. 1 to 4, the bottom 35 of the slots 21 has two bearing surfaces 30 one on each side of the groove 40 and against which the windings 22 bear. The bottom 35 of the slots is connected to the radial edges 33 by fillets 36. The groove 40 of each slot 21 is centered on the bottom 35 of said slot and extends along the axis of rotation X of the machine over the entire thickness of the ring 25, as illustrated in FIG. 12.

The grooves 40 have, in section in a plane perpendicular to the axis X, a curved shape that is in particular substantially semicircular. They have a depth p, measured radially, of between 0.2 mm and 1 mm, for example equal to 0.42 mm.

The grooves 40 form a localized narrowing of the bridges of material 27. Such a narrowing allows magnetic saturation of the lamination by a lower magnetic flux along the bridge 27, this limiting the passage of the magnetic flux.

The smallest width l of the bridges of material 27 is preferably between 0.3 mm and 0.6 mm, for example equal to 0.4 mm.

The ring 25 and/or the yoke 29 are each formed of a pack of magnetic laminations which are stacked along the axis X, the laminations being, for example, identical and exactly superposed. They may be held together by clipping, by adhesive bonding, by rivets, by tie rods, by welds and/or by any other technique. The magnetic laminations are preferably made of magnetic steel.

In the example illustrated, the teeth 23 of the ring 25 have complementary reliefs 56 on the surface allowing the various laminations that make up the ring 25 to be clipped together. The complementary reliefs 56 may be on all the teeth 23 or just on some of the teeth 23, for example on every second tooth 23.

In a variant, the laminations are adhesively bonded together or assembled in some other way.

Likewise, the yoke 29 may have complementary reliefs on the surface allowing the various laminations that make up the yoke 29 to be clipped to one another.

The ring and/or the yoke may alternatively be formed of one or more strip(s) of sheet metal cut out and wound on itself (themselves).

The yoke 29 is mounted on the ring 25 by collaboration of shapes. The ring 25 and the yoke 29 have complementary reliefs 49 on the external surface of the ring and the internal surface of the yoke, allowing these to be held in position relative to one another.

Windings

The windings 22 may be placed in the slots 21 in a concentrated or a distributed manner, preferably a distributed manner.

Figure 2:
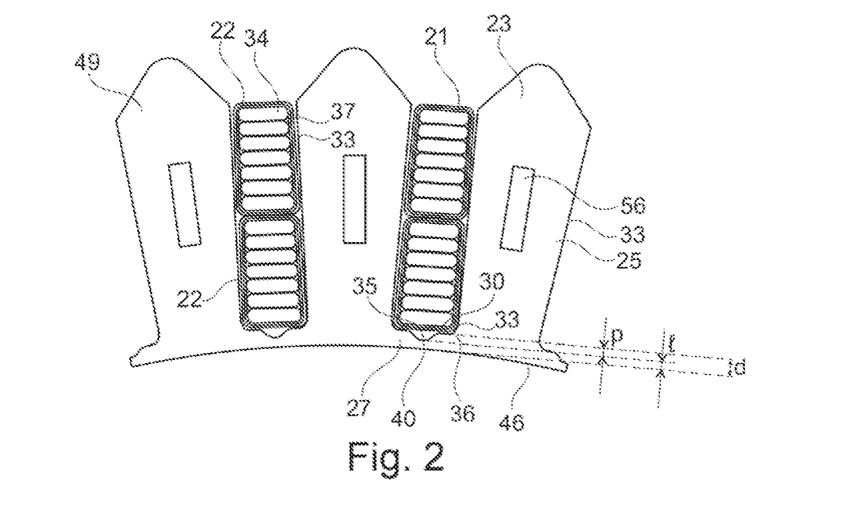

In the example illustrated in FIG. 2, the electrical conductors 34 of the windings 22 are placed in the slots in an arranged manner.

As illustrated in FIG. 2, the electrical conductors 34 preferably have a rectangular flattened transverse section and are radially superposed, for example in a single row. The electrical conductors 34 are made of copper or another conductive material that is enameled or coated with any suitable insulating coating.

Each slot 21 is able to accept two stacked windings 22, with different phases. Each winding 22 may, in transverse section, be substantially rectangular in shape.

Each winding 22 is surrounded by a sheet 37 of insulation insulating the windings from the walls 33 and 36 of the slot and the windings 22 of different phases.

The electrical conductors 22 are assembled into windings 22 outside of the slots 21 and are surrounded with a sheet of insulation 27, and the windings 22 with the sheets of insulation 37 are inserted into the slots 21. This operation is made easier by the fact that the slots are fully open radially toward the outside.

In a variant, the windings are pin windings.

Rotor

The rotor 1 depicted in FIG. 1 comprises a central opening 5 for mounting on a shaft and comprises a magnetic rotor mass 3 extending axially along the axis of rotation X of the rotor, this rotor mass being formed for example by a pack of magnetic laminations stacked along the axis X, the laminations being, for example, identical and exactly superposed.

The rotor 1 for example comprises a plurality of permanent magnets 7 placed in housings 8 of the magnetic rotor mass 3. As an alternative, the rotor is a wound rotor.

Method for Manufacturing the Stator and Machine

The stator may be obtained using the method of manufacture which will now be described.

The windings 22 are inserted into the slots 21 of the ring 25 by moving the windings 21 radially toward the inside of the slots 21.

The yoke 29 is then attached to the ring 27. The yoke 29 may be heated beforehand in order to expand it and make it easier to insert over the ring 25. After it has been inserted over the ring 25, it may shrink as it cools, making it possible to achieve a minimal clearance between the ring 25 and the yoke 29.

As a variant or in addition, the ring 25 may be cooled beforehand in order to shrink it and make the insertion of the yoke 29 easier. After the yoke 29 has been inserted, it may expand as it warms up.

Closed Lamination

Figure 3:
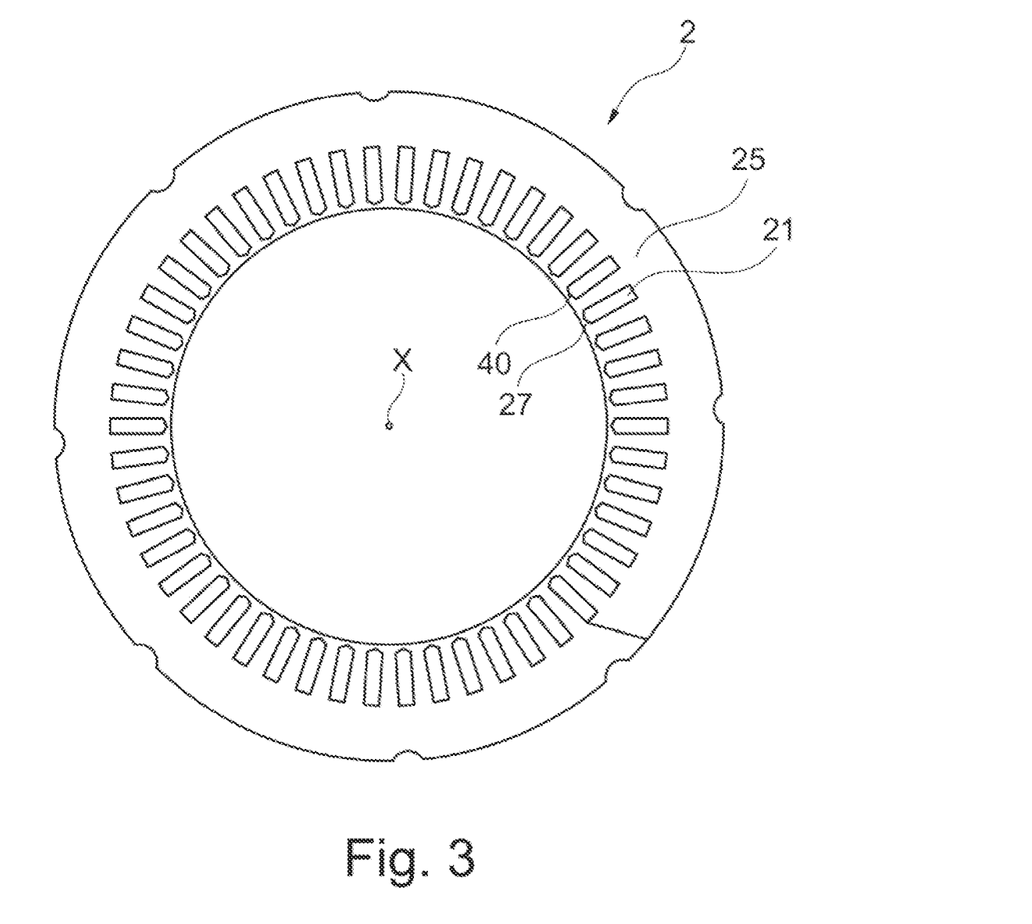
FIG. 3 depicts a variant of a stator according to the invention, FIG. 4 partially and schematically illustrates variant embodiment of the ring of the stator, FIG. 5 partially an schematically illustrates a variant embodiment of the ring of the stator, FIG.6 partially and schematically illustrates a variant embodiment of the ring of the stator.

In the variant illustrated in FIG. 3, the ring 25 has slots 21 that are closed on both sides. In that case, the windings 22 are pin windings so that they can be inserted into the slots 21 by sliding into them along an axis parallel to the longitudinal axis X.

Figure 4:
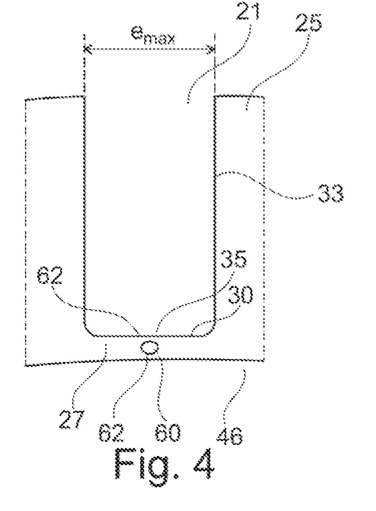

The embodiment of FIG. 4 differs from that of FIGS. 1, 2 and 12 in that the bridge of material 27 does not have a groove 40 but an opening 60 extending over the entire thickness of the ring 25. The opening 60 has a circular contour in transverse section, as illustrated. The material of the bridge 27 therefore has two thinned regions 62 on either side of the opening 60, and this allows magnetic saturation in these regions for a smaller amount of flux.

Figure 5:
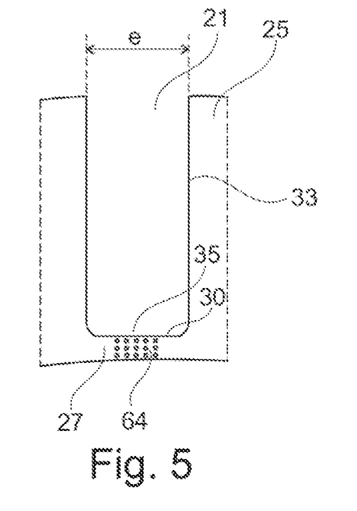

In the variant illustrated in FIG. 5, the bridge of material 27 has a plurality of microperforations 64 which reduce the cross section of lamination available for the passage of the flux, leading to magnetic saturation when the machine is in operation.

Figure 6:
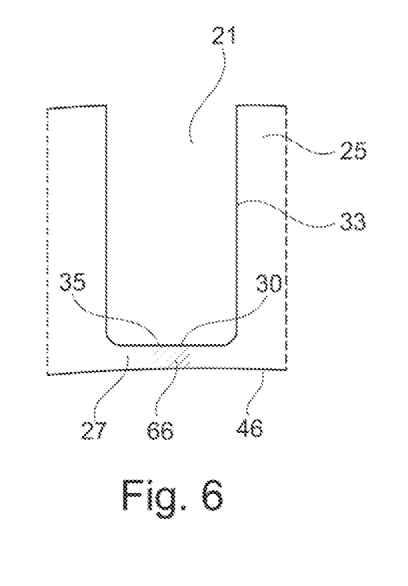

In the variant illustrated in FIG. 6, the bridge of material 27 has a heat-treated region 66 which has lower magnetic permeability, becoming magnetically saturated when the machine is in operation. The localized heat treatment may be achieved using a laser.

Figure 7:
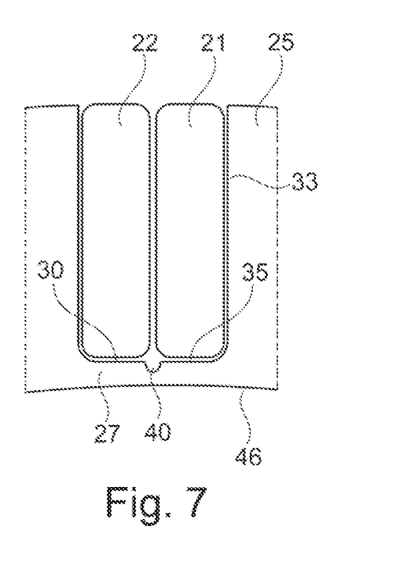
FIG. 7 is a view similar to FIGS. 4 to 6 depicting variant embodiments of the ring with the windings of the stator.

The embodiment of FIG. 7 differs from that of FIGS. 1, 2 and 12 in that the slot accepts two rows of windings 22.

Figure 8:
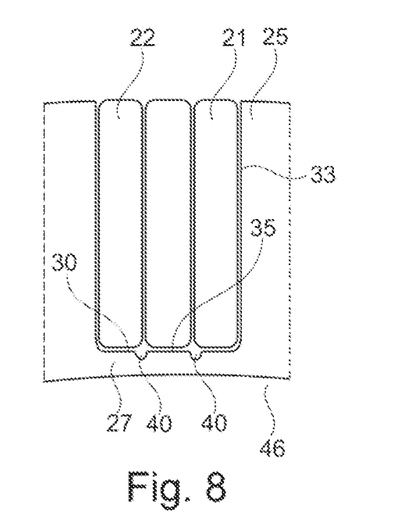
FIG. 8 is a view similar to FIGS 4 to 6 depicting variant embodiments of the ring with the windings of the stator.

The embodiment of FIG. 8 differs from that of FIGS. 1, 2 and 12 in that the slot accepts three rows of windings 22, and in that the bridge of material 27 has two grooves 40.

Figure 9:
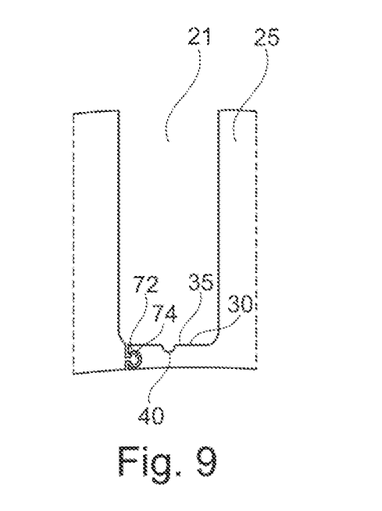
FIG. 9 a variant embodiment of the ring of the stator.
Figure 10:
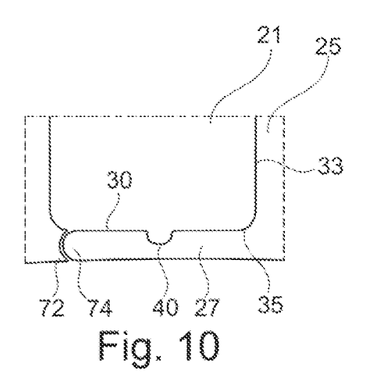
FIG. 10 illustrates a variant embodiment of the ring of the stator.
Figure 11:
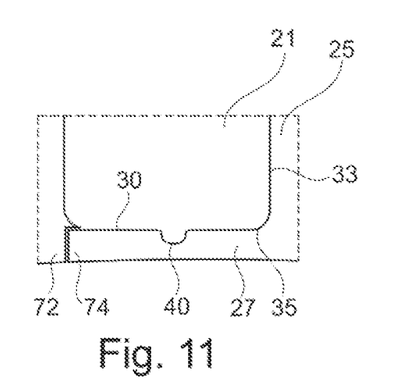
FIG. 11 illustrates a variant embodiment of the ring of the stator.

The embodiment of FIG. 9 differs from that of FIGS. 1, 2 and 12 in that at least part of the bridges of material 27 has complementary reliefs 72 and 74. These complementary reliefs 72 and 74 may be in a region of the bridge of material 27 different than the region with reduced magnetic permeability. In this embodiment, the ring 25 is manufactured by assembling segments of laminations which are assembled with one another circumferentially using the complementary reliefs 72 and 74. The complementary reliefs 72 and 74 may be complementary reliefs which fix together, for example dovetails and mortises, as is illustrated in FIG. 9. They allow two adjacent segments to be fixed together. In a variant, as illustrated in FIGS. 10 and 11, the complementary reliefs 72 and 74 are respectively projecting and recessed reliefs of complementary shapes, which come to bear against one another without there being any fixing together of the reliefs 72 and 74, as a result of the compression of the ring 25, notably by the yoke 29. They allow two adjacent segments to be held in position by the interlocking of the reliefs 62 and 64 and by the bearing of the reliefs 62 and 64 against one another, keeping the ring in compression.

Figure 13:
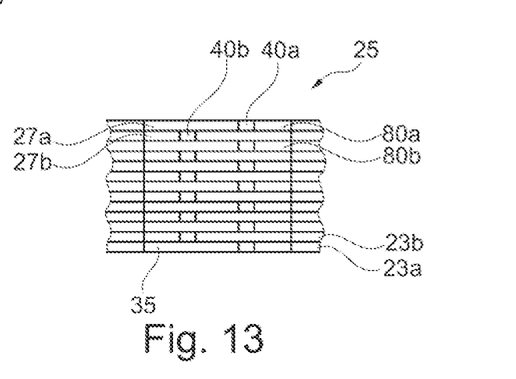
Figure 14:
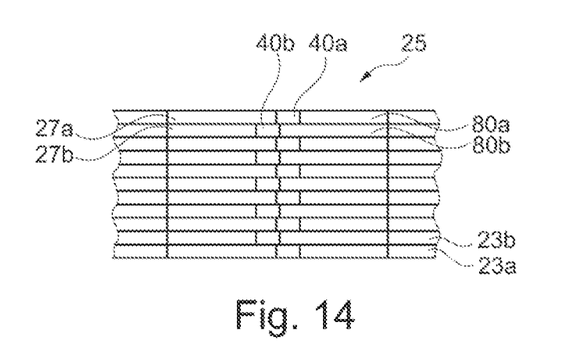

The embodiments of FIGS. 13 and 14 differ from that of FIGS. 1, 2 and 12 in that the groove 40 is not rectilinear. In these embodiments, the ring 25 is formed of a stack of laminations 80a and 80b. Each lamination 80a and 80b has teeth 23a and 23b respectively connected together at their base on the side of the air gap 47 by bridges of material 27a and 27b respectively. The grooves 40a and 40b in the bridges of material 27a and 27b of the laminations 80a and 80b are not centered in the corresponding bridge of material 27a or 27b. The grooves 80a and 80b are in an offset staggered configuration in the bottom 35 of the slot. In these embodiments, the laminations 80a and 80b are identical but the laminations 80b are turned over in relation to the laminations 80a. The grooves 40a and 40b of the laminations 80a and 80b may form a continuous groove 40 of the stator, as illustrated in FIG. 14, the grooves 40a and 40b of the laminations 80a and 80b being partially superposed in the thickness of the ring 25, or may form a discontinuous groove 40 of the stator, as illustrated in FIG. 13, the grooves 40a and 40b of the laminations 80a and 80b being noncontiguous.

Of course, the invention is not limited to the exemplary embodiments that have just been described, and the aforementioned regions of reduced magnetic permeability may, for example, not be centered.

The expression "having a" should be understood to be synonymous with "comprising at least one".

The invention claimed is:

1. A stator comprising:
  a ring comprising:
    teeth creating between them slots, the slots being open radially toward the outside of the ring, and
    bridges of material each connecting two adjacent teeth at their base on the side of the air gap and defining the bottom of the slot between these teeth, bridges of material each having at least one region of reduced magnetic permeability that is in the form of:
      at least one localized narrowing formed by at least one groove extending along the longitudinal axis of the stator in the thickness of the bridge of material or at least one localized crushing of the material in the width d of the bridge of material, and/or
      at least one opening in the width/of the bridge of material, and/or
      at least one localized treatment in the width/of the bridge of material, which locally reduces the magnetic permeability of the bridge of material, and 1
    windings each formed of a plurality of turns of a unique electrical conductor and placed in the slots of the ring after winding in a distributed manner,
  the ring being produced by superposition among a thickness of the ring of precut magnetic laminations, the precut magnetic lamination being each monobloc and forming a circumferentially complete layer of the ring, or by winding into a helix a strip of a precut magnetic sheet.

2. The stator as claimed in claim 1, the slots being open radially toward the outside of the ring.

3. The stator as claimed in claim 1, comprising a yoke attached to the ring.

4. The stator as claimed in claim 1, the slots being closed within the ring.

5. The stator as claimed in claim 1, the region of reduced magnetic permeability of each bridge of material being continuous in the thickness of the ring.

6. The stator as claimed in claim 1, bridges of material having a plurality of microperforations in the width of the bridge of material.

7. The stator as claimed in claim 1, each region of reduced magnetic permeability extending over the entire thickness of the ring.

8. The stator as claimed in claim 1, the ring taking the form of stacked laminations having teeth joined together at their base on the side of the air gap by bridges of material, at least some of the bridges of material each exhibiting at least one region of reduced magnetic permeability, the regions of reduced magnetic permeability of each of the laminations not being centered, and at least two adjacent laminations having at least two regions of reduced magnetic permeability that are arranged in an offset staggered configuration in relation to one another.

9. The stator as claimed in claim 1, bridges of material having at least one localized narrowing formed by at least one groove.

10. The stator as claimed in claim 9, the grooves being open toward the slots.

11. The stator as claimed in claim 9, the bottom of the slots having at least one bearing surface, better still at least two bearing surfaces, oriented transversely and the bottom of the groove being set back relative to this or these bearing surfaces, the windings inserted into the corresponding slot bearing against the bearing surface or surfaces and being set back with respect to the bottom of the groove.

12. The stator as claimed in claim 9, the grooves each having a profile that is curved in section in a plane perpendicular to the axis of the stator.

13. The stator as claimed in claim 1, bridges of material each having at least one localized treatment in the width l of the bridge of material, which locally reduces the magnetic permeability of the bridge of material.

14. The stator as claimed in claim 1, the bridges of material being nondeformable.

15. The stator as claimed in claim 1, the slots having a bottom which, apart from the grooves, is flat.

16. A rotary electrical machine comprising a stator as claimed in claim 1 and a rotor.

17. A stator comprising:
  a ring comprising:
    teeth creating between them slots, the slots being open radially toward the outside of the ring, and
    bridges of material each connecting two adjacent teeth at their base on the side of the air gap and defining the bottom of the slot between these teeth, bridges of material each having at least one region of reduced magnetic permeability that is in the form of:
      at least one localized narrowing formed by at least one groove extending along the longitudinal axis of the stator in the thickness of the bridge of material or at least one localized crushing of the material in the width d of the bridge of material, and/or
      at least one opening in the width/of the bridge of material, and/or
      at least one localized treatment in the width/of the bridge of material, which locally reduces the magnetic permeability of the bridge of material, and
    windings each formed of a plurality of turns of a unique electrical conductor and placed in the slots of the ring in a distributed manner, each slot receiving stacked portions of two different conductors, the portions of two different conductors being of different phases and being radially superposed such that one portion of one conductor is in an interior half part of the slot and the other portion of the other conductor is in the exterior half part of the slot.

* * * * *

UNITED STATES PATENT AND TRADEMARK OFFICE
CERTIFICATE OF CORRECTION

PATENT NO. : 12,328,031 B2
APPLICATION NO. : 17/057972
DATED : June 10, 2025
INVENTOR(S) : Jacques Saint-Michel et al.

It is certified that error appears in the above-identified patent and that said Letters Patent is hereby corrected as shown below:

In the Claims

Claim 1, Column 11, Line 19, should read --at least one opening in the width $l$ of the bridge of--

Claim 1, Column 11, Line 21, should read --at least one localized treatment in the width $l$ of the--

Claim 17, Column 12, Line 43, should read --at least one opening in the width $l$ of the bridge of--

Claim 17, Column 12, Line 45, should read --at least one localized treatment in the width $l$ of the--

Signed and Sealed this
Ninth Day of September, 2025

Coke Morgan Stewart
*Acting Director of the United States Patent and Trademark Office*